United States Patent Office 3,834,936
Patented Sept. 10, 1974

3,834,936
DRESSING LEATHER
Walter Schroer, Cologne, Johannes Eimer, Leverkusen, and Gunter Mertens, Opladen, Germany, assignors to Bayer Aktiengesellschaft, Leverkusen, Germany
No Drawing. Filed July 24, 1972, Ser. No. 274,153
Claims priority, application Germany, July 29, 1971, P 21 38 016.5
Int. Cl. B44d 1/32; C09d 3/72
U.S. Cl. 117—142                         2 Claims

ABSTRACT OF THE DISCLOSURE

A process is provided for dressing leather and artificial leather using solutions in organic solvents of combinations of (1) Polyurethanes with terminal hydroxyl groups in the molecular weight range of 5000 to 40,000 prepared by reacting linear or slightly branched polyesters in the molecular weight range of 500 to 5000 which have terminal hydroxyl groups with 3-isocyanato-3,5,5-tri-methyl-cyclohexylisocyanate,
(2a) 15 to 100% by weight, based on polyurethane, of vinyl chloride copolymers in the molecular weight range of 25,000 to 150,000 consisting of 70 to 99.5% by weight of vinyl chloride units, 0 to 30% by weight of vinyl alcohol units and/or 0 to 30% by weight of vinyl acetate units and/or 0 to 30% by weight of units corresponding to the copolymerization of $\alpha,\beta$-unsaturated mono- or dicarboxylic acids or their esters or semi-esters and 0 to 30% by weight, based on polyurethane, of nitrocellulose which may contain plasticizer, or
(2b) 30 to 130% by weight, based on polyurethane, of nitrocellulose which may contain plasticizer and optionally 0 to 15% by weight, based on polyurethane, of vinyl chloride copolymers of the type mentioned under 2a and
(3) 0 to 30% by weight, based on polyurethane, of polyisocyanates.

The use of polyurethane for the coating and preparation of support materials is already known. Organic solutions of polyesters or polyester urethanes are used together with polyisocyanates, for example, in the manufacture of patent leather.

If higher molecular weight polyurethanes are used in solution for coating leather which may or may not be primed, the coatings obtained on the leather have inferior gloss because of the low solid content and tend generally to have a sticky, rubber-like hand, poor adherence to the support material and insufficinet abrasion resistance at elevated temperatures. Moreover, because of the formation of thread-like deposits, higher molecular weight polyurethanes in solvents such as esters and ketones are not ideally suitable for spraying on leather and the poor flow connected with this threat formation is undesirable.

Moreover if highly soluble low molecular weight polyurethanes are applied to leather in the form of concentrated solutions, the cross-linking reaction with the hardeners which contain isocyanate groups takes such a long time that it is several hours before the leather is dry enough to be stacked.

The addition of polyvinyl chloride which has been rendered more soluble by the incorporation of ester, alcohol or carboxyl groups (French Patent Specification No. 1,530,730), or the addition of nitrocellulose (DP 870,479) to such polyurethane dressings is also known. The addition of these substances significantly reduces the drying time and results in a drier hand and improved flow but the flexibility and elasticity of the films are severely reduced.

It has now surprisingly been found that when solutions of polyaddition adducts which have a molecular weight in the range of 5,000 to 40,000, preferably 10,000 to 25,000, and which are prepared from linear or slightly branched polyesters and 3-isocyanato-methyl-3,5,5-tri-methylcyclohexylisocyanate are used in combination with vinyl chloride copolymers and/or nitrile cellulose and polyisocyanates, the resulting liquids are very suitable for spraying, have perfect flow properties on leather and artificial leather and dry rapidly. The coatings thus obtained after cross-linking have high crease-resistance, elasticity, suppleness, bond strength, abrasion resistance and excellent fastness to light.

This invention thus relates to the use of solutions in organic solvents of a combination of:

(1) Polyurethanes with terminal hydroxyl grouups in the the molecular weight range of 5000 to 40,000 prepared by reacting linear or slightly branched polyesters with terminal hydroxyl groups in the molecular weight range of 500 to 5000 with 3-isocyanato-3,5,5-trimethylcyclo-hexylisocyanate.
(2a) 15 to 100% by weight, based on polyurethane, of vinyl chloride copolymers of the molecular weight range of 25,000 to 150,000 consisting of 70 to 99.5% by weight of vinyl chloride units, 0 to 30% by weight of vinyl alcohol units and/or 0 to 30% by weight of vinyl acetate units and/or 0 to 30% by weight of units corresponding to the copolymerization of $\alpha,\beta$-unsaturated mono- or dicarboxylic acids or their esters or semi-esters and optionally 0 to 30% by weight, based on polyurethane, of nitrocellulose which may or may not contain plasticizers, or
(2b) 30 to 130% by weight, based on polyurethane, of nitrocellulose which may or may not contain plasticizers and 0 to 15% by weight, based on polyurethane, of vinyl chloride copolymers of the kind mentioned under 2a,
(3) 0 to 80% by weight, based on polyurethane, of polyisocyanates and may additionally contain
(4) the usual auxiliary agents such as accelerators, stabilizers, etc.
for dressing leather and artificial leather.

The preparation of the polyurethanes mentioned under 1. is carried out according to the known processes of polyurethane chemistry by reacting linear or slightly branched polyesters which have terminal hydroxyl groups and which have molecular weights in the range of 500 to 5000, preferably 2000 to 3500, with 3-isocyanatomethyl-3,5,5-trimethylcyclohexylisocyanate at NCO/OH ratios of 0.5 to 0.99, preferably 0.6 to 0.9, in order to obtain molecular weights of the polyurethane of between 5000 and 40,000, preferably 10,000 and 25,000.

The polyesters are prepared by known processes such as, for example, those described in U.S. Pats. 3,201,372; 3,493,525 and the like. Polyesters having terminal hydroxyl groups are obtained, for example, by reacting polyfunctional, preferably difunctional alcohols, e.g. ethylene glycol, hexamethylene glycol, triethylene glycol, tetraethylene glycol, pentaethylene glycol, hexaethylene glycol, dipropylene glycol, tripropylene glycol, pentapropylene glycol, heptapropylene glycol, trimethylolpropane or hexanetriol with polycarboxylic acids, in particular dicarboxylic acids such as adipic acid or phthalic acids. Suitable polyesters polyols may also be prepared by the polycondensation of $\epsilon$-hydroxycarboxylic acids or by polymerization of the corresponding lactones, e.g. $\epsilon$-caprolactone. If desired, higher functional components, e.g. trimethylolpropane and hexanetriol, may also be added in the preparation of the polyesters in quantities of not more than 0.5 mol percent, based on the quantity of glycol used. The polyesters preferably used in the preparation of the polyurethanes of the invention are hydroxyl-polyesters prepared from adipic acid and diethylene glycol.

If other polyisocyanates are used in the preparation of the polyurethanes, e.g. those listed in U.S. Pat. 3,350,362 including tolylene diisocyanates, 4,4'-diisocyanatodiphenylmethane, hexamethylenediisocyanate or 4,4'-diisocyanatodicyclohexylmethane, the coatings obtained from a combination of such polyurethanes with vinyl chloride copolymers and/or nitrocellulose and polyisocyanates have poor crease-resistance and elasticity and often insufficient gloss owing to the mutual incompatibilities. Nevertheless, these polyurethanes and other higher molecular weight polyurethanes may be added in quantities of 0 to 200% by weight, preferably 0 to 60% by weight, based on the polyurethanes mentioned under (1), without the advantageous properties of the compositions prepared according to the invention being unduly impaired.

The vinyl chloride copolymers mentioned under (2a) and (2b) are copolymers which consist of 70 to 99.5% by weight of vinyl chloride units, 0 to 30% by weight of vinyl alcohol units and/or 0 to 30% by weight of vinyl acetate units and/or 0 to 30% by weight of units corresponding to $\alpha,\beta$-unsaturated mono- or dicarboxylic acids or their esters or semi-esters. The monocarboxylic acids used are preferably $\alpha,\beta$-unsaturated carboxylic acids having 3 to 6 carbon atoms and the monocarboxylic acid esters are preferably reaction products of these carboxylic acids with monohydric alcohols having 1 to 8 carbon atoms. Examples of these acids and esters are acrylic acid, methacrylate, methacrylic acid, ethylmethacrylate, butyl acrylate, acrylic acid 2-ethylhexyl ester and crotonic acid butyl ester. Maleic acid, fumaric acid and tetrahydrophthalic acid are examples of suitable dicarboxylic acids with 4 to 8 carbon atoms. The dicarboxylic acid esters and dicarboxylic acid semi-esters should be understood to be mainly mono- and dialkyl esters of these dicarboxylic acids. Examples of these are diethylmaleate, monoethylmaleate, dibutyl fumarate, monobutylfumarate, dimethyltetrahydrophthalate and monomethyltetrahydrophthalate; further examples are contained in U.S. Pat. 3,225,110. The vinyl chloride copolymers have molecular weights of 25,000 to 150,000, in particular 40,000 to 100,000.

The nitro compounds mentioned under (2a) and (2b) may be either the ester soluble commercial collodium wools which when made up into 3 to 33% solution in butyl acetate (98/100%) have a viscosity of 5000 cp., or any alcohol soluble wools which when made up into 7 to 28% solutions in ethanol (92 to 94%) and benzene in the ratio of 1:1 have a viscosity of 5000 cp. The plasticizers present in commercial collodium chips have no harmful effects.

The solutions used according to the invention contain either 15 to 100% by weight, preferably 30 to 70% by weight, based on the polyurethane mentioned under (1), of the vinyl chloride copolymers in combination with 0 to 30% by weight, preferably 5 to 15% by weight, based on the polyurethane mentioned under (1), of nitrocellulose (which may contain plasticizer) or 30 to 160% by weight, preferably 40 to 90% by weight, based on the polyurethane mentioned under (1), of nitrocellulose (which contains plasticizer) in combination with 0 to 15% by weight, based on the polyurethane mentioned under (1) of the vinyl chloride copolymers. Equally good results are obtained in both cases, i.e. either when using a high vinyl chloride copolymer excess compared with the amount of nitrocellulose used or when using a high nitrocellulose excess compared with the amount of vinyl chloride copolymer. Compositions which contain vinyl chloride copolymer alone without nitrocellulose or those which contain only nitrocellulose and no vinyl chloride copolymer may also be used.

The polyisocyanates mentioned under (3) are compounds well known in polyurethane chemistry but those with a low vapor pressure are especially suitable e.g. dimerization and trimerization products of poly-functional aliphatic and/or aromatic isocyanates such as tolylene diisocyanate or tolylene diisocyanate together with hexamethylene diisocyanate, the addition product of 3 mols of tolylene-2,4-diisocyanate and 1 mol of trimethylolpropane, tri-(4-isocyanatophenyl)-thiophosphoric acid ester, the biuret triisocyanate obtainable from hexamethylene diisocyanate and water, or commercial polyisocyanate mixtures obtained by the phosgenation of aniline formaldehyde condensates.

The polyisocyanates are used in quantities of 0 to 30% by weight, preferably 25 to 50% by weight, based on the weight of the polyurethane mentioned under (1).

The auxiliary agents mentioned under (4), are catalysts, i.e. compounds which accelerate the NCO/OH reaction, e.g. tertiary amines, lead compounds and tin compounds as suggested in U.S. Pat. 3,201,372, fillers which effect the gloss, e.g. silicic acid, aluminium silicates, talcum, kieselgur, metal salts of fatty acids and cellulose acetobutyrate, and the usual additives which improve flow, wetting effect, bonding, etc.

Suitable solvents for components (1) to (4) are solvents which do not contain any groups which react with isocyanate groups, e.g. acetone, methyl ethyl ketone, methyl isobutyl ketone, diisobutyl ketone, tetrahydrofuran, ethyl acetate, butyl acetate, methyl glycol acetate, ethyl glycol acetate, dimethylformamide, methylene chloride, ethylene chloride, propylene chloride, aromatic hydrocarbons and the like.

The quantity of solvent or solvents used is generally sufficient to insure that the solutions can be stirred and have no tendency to gel. The term "solution" is used in this context to mean organic, preferably liquid systems which contain colloidal components and in which insoluble components such as fillers may be dispersed. Cloudiness may occasionally appear even when no insoluble components are present but this does not detract from the advantageous properties of the dressing.

The coating or dressing of synthetic or natural leather is carried out exclusively with the compositions described above in either one or more applications. If more than one application is used, the first application should be regarded as primers and may be adapted to the material which is to be coated with regard to the filling and sealing effect and the softness. This adaptation may be achieved by varying the concentration of the solution, or the proportion of the softer polyurethane component to the harder nitocellulose and PVC component.

Aqueous dressings may also be used in addition to the compositions of the invention, for example the preparations described above may be applied to leather which has been primed with a conventional primer coat used to strengthen the grain of the leather. The compositions may also be applied as a protective coating to non-pigmented colored leather, the so-called aniline leathers, to which the polymed dispersions may, if desired, be applied as primer coatings. The main effect of this treatment is to increase the water resistance and dirt repellence of this type of leather, which is particularly sensitive.

The hand of the coatings obtained with preparations of this invention may be varied as desired by the addition of natural, semi-synthetic or synthetic low molecular weight or high molecular weight compounds, for example caprolactam, natural or synthetic waxes, natural resins, polymers which are soluble in organic solvents, silicone oils and longer chained alcohols having a hydrocarbon chain or 8 to 20 carbon atoms. The flow, wetting effect and bond strength of the compositions of the invention may be influenced not only by the degree of dilution and by the addition of wetting agents which are soluble in organic solvents, e.g. silicone oils, but also by the properties of the solvents, i.e. their dissolving power, boiling point and evaporation time. The dressings of the invention are applied by the methods of application conventionally employed in the art for substances which are dissolved in organic solvents, e.g. application with air spray guns or airless spray guns, application by casting using a casting machine, application with rollers or wiper applicators or by the reversal process. Pressing between applications and after the final application using rotary or hydraulic presses at the temperatures normally employed for the opeation improves the quality of the smoothness and seal of the leather. Each application may be dried at normal temperature or at elevated temperatures of up to 180° C. in drying chambers or drying channels. The dressings according to the invention are normally applied in quantities of between 5 and 20 g./m.², depending on the absorbency of the leather and the effect required.

The products of this invention may be used in any application in which leathers or dressed leathers are generally employed such as, for example, in clothing, shoes, handbags, luggage and so on.

The invention is further illustrated but is not intended to be limited by the following examples in which all parts and percentages are by weight unless otherwise specified.

EXAMPLE 1

A grained cowhide or grained calf leather which has been vat dyed with aniline dye and chrome tanned is primed with a primer composition of 150 parts of a commercial polymer dispersion used for leather dressings, containing 40% of a copolymer of butadiene and acrylonitrile,
30 parts of a commercial plasticized casein gloss and
820 parts of water applied with a plush applicator or spray applicator. The following dressing composition is then applied to the primed aniline leather by spraying or casting:

150 parts of a 20% solution, in a mixture of equal parts of ethyl acetate and toluene, of a polyurethane having an average molecular weight of 22,000 which has been prepared from 1000 parts of a polyester of adipic acid and dipropylene glycol (molecular weight 2,600) and 77.4 parts of 3-isocyanato-methyl-3,5,5-trimethyl-cyclohexylisocyanate,
10 parts of a 5% solution in ethyl acetate of a PVC copolymer (molecular weight 70,000) of 88% of vinyl chloride, 4% of vinyl alcohol and 8% of vinyl acetate,
200 parts of a 10% solution of commercial ester soluble collodium wool in ethyl acetate which has a viscosity of 5000 cp. as a 6% solution in 98/100% butyl acetate,
20 parts of a 60% solution in butyl acetate of a copolyadduct having an NCO content of 10.2% prepared from 1 part of hexamethylene diisocyanate and 2 parts of tolylene-2,4-diisocyanate, and
620 parts of a mixture of equal parts of toluene and methyl ethyl ketone.

After a few minutes drying, a coating with a silky gloss is obtained which does not spoil the natural appearance of the dyed leather but eliminates its sensitivity to moisture and dirt. The dressing described here has in particular excellent fastness to light in addition to very high abrasion resistance. Moreover, there is no risk of the formation of threads when spraying the dressing and the flow of the liquid dressing on the leather is completely satisfactory. The impact resistance and flexural strength are high.

EXAMPLE 2

A conventionally tanned and dyed lambskin leather used for gloves is dressed with the following liquid applied by spraying:

100 parts of a 15% solution in a mixture of equal parts of methyl ethyl ketone and toluene, of a polyurethane having an average molecular weight of 14,000, which has been prepared from 1000 parts of a polyester of adipic acid and ethylene glycol (molecular weight of 2000) and 75.0 parts of 3-isocyanatomethyl-3,5,5-trimethyl cyclohexylisocyanate,
50 parts of a 10% solution, in equal parts of ethyl acetate and ethyl glycol acetate, of a polyurethane having an average molecular weight of 60,000, which has been prepared from 1000 parts of a polyester of adipic acid and butane-1,4-diol (molecular weight=2200) and 78.5 parts of tolylene-2,4- and -2,6-diisocyanate (ratio of isomers 65:35),
100 parts of a pigmented collodium solution in butyl acetate, having a solid content of 10% of ester soluble nitrocellulose which has a viscosity of 5000 cp. as a 14% solution in 98 to 100% butyl acetate,
15 parts of a 60% solution in butyl acetate of the polyisocyanate mentioned in Example 1, and
735 parts of a mixture of equal parts of ethyl acetate, ethyl glycol acetate and toluene.

An evenly colored, soft, supple, velvety leather, which is dirt repellent and shows no cracks in the dressing layer when highly stretched is obtained. The spray quality and flow of this liquid are outstandingly suitable for dressing leather. The light fastness is good and the abrasion resistance excellent.

EXAMPLE 3

A retanned chromed neat's leather rubbed down with sandpaper grade 280 is dressed according to the method described in W. Grassmann: "Handbüch der Gerbereichemie und Lederfabrikation*", Volume III/I page 889 (first primer, primer composition, spray dye) without the step of fixing by manual and spray application, and then pressed at 60° C. and 200 atmospheres pressure. A thick coat of dressing of the following composition is applied by spraying:

350 parts of a 20% solution, in a mixture of equal parts of methyl ethyl ketone and toluene, of a polyurethane having an average molecular weight of 15,000, prepared from 1000 parts of a polyester of adipic acid and diethylene glycol (molecular weight=2600) and 77.4 parts of 3-isocyanatomethyl-3,5,5-trimethyl-cyclohexylisocyanate,
350 parts of a PVC copolymer solution in methyl ethyl ketone, having a solid content of 10% of a copolymer of molecular weight 95,000 consisting of 92% of vinyl chloride, 3% of vinyl alcohol and 5% of vinyl acetate,
65 parts of a 60% solution in butyl acetate of the polyisocyanate mentioned in Example 1, and
235 parts of a mixture of equal parts of methyl ethyl ketone and toluene.

The leathers obtained are distinguished from leathers which have been dressed according to Example 1 of French Patent Specification No. 1,530,730 by their distinctly higher gloss. The dressing prepared according to the invention is also superior in its spraying quality and its flow. In the test for flexural strength in the Bally Flexometer, damage occurs only after 20,000 flexures. The light fastness is good.

If instead of the polyurethanes with terminal hydroxyl groups described under 1, which are used according to the invention, which have a molecular weight range of 5000 to 40,000 and which are prepared from polyesters having an average molecular weight of 500 to 5000 and 3-isocyanato-methyl - 3,5,5 - trimethylcyclohexylisocyanate, the same quantities of polyurethanes which have the same molecular weight range but have been prepared by reacting the polyesters with other isocyanates, e.g. tolylene diisocyanates, 4,4'-diisocyanatodicyclohexylmethane, hexamethylene diisocyanate and the like are used in the above examples, the gloss of the resulting dressings is much reduced and may even be regarded as grey and matt and in the Bally Flexometer the dressings show cracking after only a few thousand flexures.

---

*2nd edition, Springer-Verlag, Wien, 1961.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for dressing leather and artificial leather by applying thereto solutions in organic solvents of combinations of
   (a) polyurethanes with terminal hydroxyl groups in the molecular weight range of 5000 to 40,000 prepared by reacting linear or slightly branched polyesters in the molecular weight range of 500 to 5000 which have terminal hydroxyl groups with 3-isocyanato-3,5,5-trimethyl-cyclohexylisocyanate,
   b(i) 15 to 100% by weight, based on polyurethane, of vinyl chloride copolymers in the molecular weight range of 25,000 to 150,000 consisting of 70 to 99.5% by weight of vinyl chloride units, 0 to 30% by weight of vinyl alcohol units, 0 to 30% by weight of vinyl acetate units and 0 to 30% by weight of units corresponding to the copolymerization of $\alpha,\beta$-unsaturated mono- or dicarboxylic acids or their esters or semi-esters and 0 to 30% by weight, based on polyurethane, of nitrocellulose which may contain plasticizer, or
   b(ii) 30 to 130% by weight, based on polyurethane, of nitrocellulose which may contain plasticizer and optionally 0 to 15% by weight, based on polyurethane, of vinyl chloride copolymers of the type mentioned under b(i) and
   (c) 0 to 80% by weight, based on polyurethane, of polyisocyanates and then allowing the coating to dry so that a dressing of between 5 and 50 g./m.$^2$ remains on the substrate.

2. The process of claim 1 in which the polyurethane with terminal hydroxyl groups is the reaction product of polyesters of adipic acid and diethylene glycol which contain terminal hydroxyl groups and 3-isocyanato-3,5,5-trimethyl-cyclohexylisocyanate.

References Cited

UNITED STATES PATENTS

| 3,551,830 | 12/1970 | Hodge et al. | 117—142 X |
| 3,321,420 | 5/1967 | Unger | 117—142 X |
| 3,678,009 | 7/1972 | Lohse et al. | 260—75 NP |

WILLIAM D. MARTIN, Primary Examiner

H. J. GWINNELL, Assistant Examiner

U.S. Cl. X.R.

117—161 KP, 166; 260—17 R